March 17, 1970
E. ENDE
3,501,209
ROLLER BEARING FOR THE STAR PINS OF
UNIVERSAL JOINTS OR THE LIKE
Filed Jan. 26, 1968
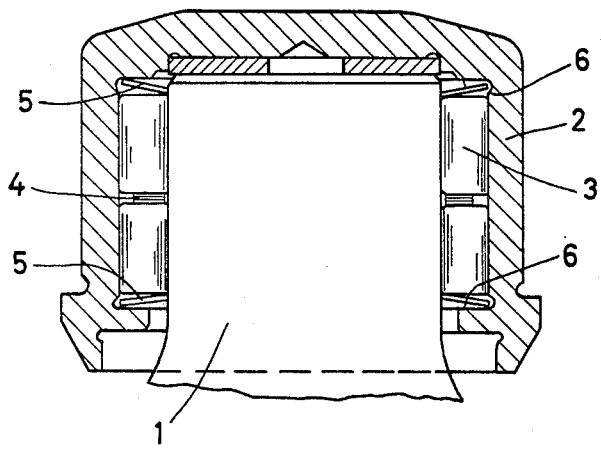
INVENTOR.
Eberhard Ende

United States Patent Office 3,501,209
Patented Mar. 17, 1970

3,501,209
ROLLER BEARING FOR THE STAR PINS OF UNIVERSAL JOINTS OR THE LIKE
Eberhard Ende, Essen, Germany, assignor to Gelenkwellenbau G.m.b.H., Essen, Germany, a corporation of Germany
Filed Jan. 26, 1968, Ser. No. 700,996
Claims priority, application Germany, Feb. 3, 1967,
G 49,174
Int. Cl. F16c 13/00, 33/00, 35/06
U.S. Cl. 308—207       4 Claims

ABSTRACT OF THE DISCLOSURE

The ring-shaped arrangement of rollers in a star-pin bearing for a universal joint is bordered on each axial side by a frusto-conical spring ring whose outer peripheral edge bears against a shoulder of the bearing bushing and whose inner peripheral edge presses against the rollers. The rollers follow each other so closely as to require no retainer and are arranged in axially sequential groups separated from each other by a floating ring.

---

My invention relates to roller bearings of the full or non-clearance type for the star pins of universal joints, particularly of heavy universal joints for transmitting large amounts of torque, in which the rollers are not kept peripherally spaced by an inserted retainer ring but substantially fully occupy the peripheral space about the bearing pin. The invention, however, also concerns roller bearings of the full or non-clearance type in other arrangements in which the bearing pins or shafts perform only slight oscillating rotations relative to the bushing.

In universal joints the star pins perform only slight oscillating movements in the bushing or housing of the appertaining anti-friction bearing. During such movements the rollers roll but a few angular degrees forward and back along the races formed by the pin and the bushing. Since this takes only partially advantage of the available running surfaces, it appreciably reduces the useful lifetime of such bearings. Attempts have been made therefore to provide for additional peripheral rotation of the ring of rollers in order to secure a better utilization of the available running or race surfaces.

Although in conventional roller bearings with ledge-guided rollers some additional peripheral movement of the roller group can be attained, this effect is greatly dependent upon a given precision in the condition of the bearing, and hence upon accidental coincidence of several tolerances, particularly the radial and axial amounts of clearance.

Also known is a full-type roller bearing in which the annular groups of rollers are not guided between two fixed shoulder ledges but between only one fixed ledge on one side and an axially spring-biased ring on the opposite side. In this design, some motion of the rollers relative to the running surfaces occurs when the rollers are not or only slightly loaded, that is when the universal joint operates under no-load conditions or transmits but a slight torque, such relative motion of the rollers being due to the friction occurring between the axial faces of the rollers and the fixed ledge or the ring. However, since the rollers are pressed against a rigid shoulder face, this bearing involves the tendency of causing edging of the rollers if the diameters of the rollers are not precisely the same or if the rollers are not loaded to exactly the same extent or the end frees of the rollers do not extend accurately at a right angle to the roller axis. Such edging tendency also reduces the useful lifetime of the bearing.

It is an object of my invention to provide a bearing for slight relative oscillatory rotation of the bearing pin, preferably for the star pin of universal joints, which constrainedly provides for an additional peripheral motion of the arrangement of bearing rollers so as to more uniformly utilize the entire periphery of the available running surfaces and thereby increase the useful lifetime of the bearing, without entailing the above-mentioned disadvantages of the known roller bearings of the full (non-clearance) type.

To this end, I provide a roller bearing according to the invention with two elastically yieldable rings on opposite axial sides respectively of the roller arrangement within the bushing of the bearing with these rings kept prestressed against the roller arrangement.

According to another, preferred feature of my invention, the elastically yieldable rings on both sides of the roller arrangement are formed as frusto-conical disc springs.

According to still another, preferred feature of the invention I provide a full-type roller bearing with two or more axially sequential ring groups of rollers and disposed between each two of them a spacer ring which is not fastened or supported on the bushing of the bearing so as to be floating in the axial direction.

In a roller bearing according to the invention, the ring shaped arrangement or groups of rollers which are substantially fully occupied by the rollers, may be looked upon as constituting in totality a floating sleeve or bushing arranged between two springy rings or disc springs. These springy rings provide for continuous freedom of mobility in the axial direction in permitting some yielding movement of the entire roller arrangement which thus may follow any occurring displacing tendency, the elastic rings being effective to press the rollers back to the correct normal position when the displacing force becomes relieved. During such operation, any damage or edge markings and the like, as might otherwise occur at the axial faces of the rollers are avoided. Furthermore, the axial prestress effected by the elastic rings or discs springs causes frictional braking of the peripheral travel of the rollers to occur as soon as the rollers become relieved of pressure. As a result there occurs an additional peripheral travel or migration of the roller group in the peripheral direction with each stroke of the oscillating rotation. The cumulative effect, therefore, is to distribute the supporting action on the race surfaces uniformly over the entire periphery.

The invention will be further described with reference to an embodiment of a bearing illustrated by way of example on the accompanying drawing. The single figure shows, partly in diametrical section, a full-type roller bearing for the star pin of a universal or cardanic joint.

A universal joint comprises two fork members 90° displaced from each other and firmly mounted on respective shafts which are to be joined by the universal joint. The two fork members are interconnected by a star piece generally in the shape of a cross which has four radial star pins 90° displaced from each other in a single plane. Each two coaxial star pins are journalled in the two legs of one of the respective fork members. Of the conventional design just mentioned, only one of the star pins is shown on the drawing. The star pin 1 is coaxially surrounded by a bearing bushing 2 which is adapted to be press-fitted into a bore of one of the legs (not shown) of one of the fork members.

Coaxially mounted between the star pin 1 and the bushing 2 are two ring groups of rollers 3 separated from each other by a freely floating spacer ring 4. A ring shaped spring disc 5 is located on each of the axial ends of the roller arrangement and has its outer peripheral edge rest against an abutment formed by an annular shoulder face 6 of the bushing 2, whereas the inner peripheral edge of each spring bears against the adjacent axial faces of the rollers. The two springs 5, each being of frusto-conical shape, are thus prestressed between the shoulder ledges 6 of the bushing 2 and the group of rollers. As a consequence, the entire roller arrangement including the spacer disc 4 is freely floating and constitutes a floating bushing capable of some amount of axial displacement. The ring shaped groups of rollers thus have some degree of independence with respect to their position relative to the race surfaces, so that minimal displacement tendencies of the rollers, occurring at the moment when the rollers are relieved of the driving load, are compensated by the action of the disc springs 5.

The axial prestress of the disc springs is so dimensioned that the rollers perform a normal oscillating travel motion when the bearing is subjected to its normal load. However, when the bearing runs under no-load conditions or transmits but a slight torque, the rollers are slightly braked so that when the rollers are thereafter subjected to a new load, they will commence their pendulous motion form a new starting position relative to the raceway. As a result, the entire periphery of the race surfaces on the bearing pin and the bushing is uniformly utilized for the purpose of transmitting the load. This, in conjunction with the floating arrangement of the roller arrangement, leads to a considerable increase in the useful lifetime of the bearing.

The spacer disc 4 prevents the two roller groups from becoming intermeshed on account of slight differences in the lengths of the rollers, and thus permits the two roller groups to exhibit a slightly different behavior independently of each other with respect to their respective motion in the peripheral direction.

I claim:
1. A roller bearing for the star pins of universal joints and other bearing pins of slight oscillatory rotation, comprising a bearing bushing which coaxially surrounds a pin and relative to which the pin performs slight oscillatory rotation, a plurality of bearing rollers arranged in a ring about the periphery of said pin and located between said pin and said bushing, and two rings located coaxially to the pin and to the ring arrangement of rollers at the respective axial ends of the ring arrangement of rollers within said bushing, said rings being elastically yieldable in the axial direction and prestressed against said ring arrangement of rollers.

2. In a roller bearing according to claim 1, said rings being formed of frusto-conical disc springs.

3. In a roller bearing according to claim 2, said bushing forming a peripheral abutment shoulder for each of said two disc springs, and each of said springs having an outer peripheral edge engaging one of said respective shoulders and an inner peripheral edge engaging the rollers of said ring arrangements.

4. In a roller bearing according to claim 1, said ring arrangement comprising a plurality of coaxially adjacent groups of rollers, and a floating spacer ring coaxially disposed between said groups.

References Cited
FOREIGN PATENTS 1,403,383   5/1965   France.
  379,205   8/1964   Switzerland.

MARTIN P. SCHWADRON, Primary Examiner

FRANK SUSKO, Assistant Examiner